(12) United States Patent
Allcock et al.

(10) Patent No.: US 6,605,237 B2
(45) Date of Patent: Aug. 12, 2003

(54) POLYPHOSPHAZENES AS GEL POLYMER ELECTROLYTES

(75) Inventors: Harry R. Allcock, State College, PA (US); E. Clay Kellam, III, State College, PA (US); Robert V. Morford, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 139 days.

(21) Appl. No.: 09/892,436

(22) Filed: Jun. 28, 2001

(65) Prior Publication Data

US 2002/0014616 A1 Feb. 7, 2002

Related U.S. Application Data

(60) Provisional application No. 60/214,933, filed on Jun. 29, 2000.

(51) Int. Cl.⁷ ............................ H01B 1/12; C08G 79/02
(52) U.S. Cl. ........................ 252/500; 252/62.2; 528/399; 528/422
(58) Field of Search ................. 252/62.2, 500; 528/399, 422

(56) References Cited

U.S. PATENT DOCUMENTS

| | | | | |
|---|---|---|---|---|
| 4,523,009 A | | 6/1985 | Neilson et al. | 528/399 |
| 4,898,929 A | * | 2/1990 | Klobucar et al. | 528/399 |
| 4,945,139 A | * | 7/1990 | Kolich et al. | 525/538 |
| 5,548,060 A | * | 8/1996 | Allcock et al. | 528/487 |
| 5,562,909 A | * | 10/1996 | Allcock et al. | 424/280.1 |
| 6,214,251 B1 | * | 4/2001 | Wu et al. | 252/62.2 |
| 6,392,008 B1 | * | 5/2002 | Allcock et al. | 528/399 |

OTHER PUBLICATIONS

Koksbang, et al, Review of Hybrid Polymer Electrolytes and Rechargeable Lithium Batteries, *Solid State Ionics*, vol. 69, 1994, pp. 320–335.

Svanberg, et al, Diffusive and Segmental Dynamics in Polymer Gel Electrolytes, *J. of Chem. Physics*, vol. 111, No. 24, 1999, pp. 11216–11221.

Stallworth, et al, Sodium–23 NMR and Complex Impedance Studies of Gel Electrolytes Based on Poly(acrylonitrile), *Solid State Ionics*, vol. 73, 1994, pp. 119–126.

Edmondson, et al, High Pressure NMR and Electrical Conductivity Studies of Gel Electrolytes Based on Poly(acrylonitrile), *Solid State Ionics*, vol. 85, 1996, pp. 173–179.

Blonsky, et al, Polyphosphazene Solid electrolytes, *J. Am. Chem. Soc.*, vol. 106, 1984, pp. 6854–6855.

Allcock, et al, Synthesis and Characterization of Ionically Conducting Alkoxy Ether/Alkoxy Mixed–Substituent Poly(organophasphazenes) and Their Use as Solid Solvents for Ionic Conduction, *Macromolecules*, vol. 29, No. 6, 1996, pp. 1951–1956.

(List continued on next page.)

*Primary Examiner*—Mark Kopec
(74) *Attorney, Agent, or Firm*—Anthony J. DeLaurentis (57) ABSTRACT

Co-subsituted linear polyphosphazene polymers that useful in gel polymer electrolytes having an ion conductivity at room temperature of at least about $10^{-5}$ S/cm and comprising (i) a polyphosphazene having controlled ratios of side chains that promote ionic conductivity and hydrophobic, non-conductive side chains that promote mechanical stability, (ii) a small molecule additive, such as propylene carbonate, that influences the ionic conductivity and physical properties of the gel polymer electrolytes, and (iii) a metal salt, such as lithium trifluoromethanesulfonate, that influences the ionic conductivity of the gel polymer electrolytes, and methods of preparing the polyphosphazene polymers and the gel polymer electrolytes are disclosed.

16 Claims, 6 Drawing Sheets

| | O(CH₂CH₂O)₂CH₃ | OCH₂CF₃ |
|---|---|---|
| Polymer 3 | 20% | 80% |
| Polymer 4 | 40% | 60% |
| Polymer 5 | 60% | 40% |
| Polymer 6 | 80% | 20% |

OTHER PUBLICATIONS

Allcock, et al, Synthesis of Polyphosphazenes with Ethyleneoxy–Containing Side Groups: New Solid Electrolyte Materials, *Macromolecules*, vol. 29, No. 10, 1996, pp. 3384–3389.

Allcock et al, Polyphosphazenes Bearing Branched and Linear Oligoethyleneoxy Side Groups as Solid Solvents for Ionic Conduction, *Macromolecules*, vol. 29, No. 23, 1996, pp. 7544–7552.

Allcock, et al, Polyphosphazenes Functionalized with Sulfone or Sulfoxide Groups: Synthesis, characterization, and Possible Polymer Electrolyte Applications, *Macromolecules*, vol. 31, No. 23, 1998, pp. 8036–8046.

Allcock, et al, Communications to the Editor: Synthesis of Poly(organophosphazene) Copolymers and Cross–Linked Polymers by Ligand Exchange, *Macromolecules*, vol. 5, No. 2, 1972, pp. 231–232.

Honeyman, et al, Ambient Temperature Synthesis of Poly(dichlorophosphazene) with Molecular Weight Control, *J. Am. Chem. Soc.*, vol. 117, No. 26, 1995, pp. 7035–7036.

Ratner, et al, Ion Transport in Solvent–Free Polymers, *Chem. Rev.*, vol. 88, No. 1, 1988, pp. 109–124.

Fulcher, Annalysis of Recent Measurements of the Viscosity of Glasses, *J. Am. Ceram. Soc.*, vol. 8, 1929, pp. 339–355.

Tammann, et al, Die Abhangigkeit der Viscositat von der Temperatur bei unterkuhlten Flussigkeiten, *Z. Anorg. Allg. Chem.*, vol. 156, 1926, pp. 245–257.

Vogel, Das Temperatureabhangigkeitsgesetz der Viskositat von Flussigkeiten, *Phys. Z.*, vol. 22, 1921, pp. 645–646.

Bennett, et al, Radiation Cross–Linking of Poly[bis(2–(2–methoxyethoxy)ethoxy)phosphazene]: Effect on Solid–State Ionic Conductivity, *Chemistry of materials*, vol. 1, No. 1, 1989, pp. 14–16.

Fenton, et al, Complexes of Alkali Metal ions with Poly(ethylene oxide), *Polymer*, 1973, vol. 14, Nov., p.589.

Sung, et al, Preparation and Characterization of Poly(vinyl chloride–co–vinyl acetate)–Based Gel Electrolytes for Li–Ion Batteries, *J. Electrochem. Soc.*, vol. 145, No. 4, Apr. 1998, pp. 1207–1211.

Croce, et al, Synthesis and Characterization of Highly Conducting Gel Electrolytes, *Electrochemica Acta*, vol. 39, No. 14, pp.2187–2194.

Ballard, et al, Ionic Conductivity in Organic Solids Derived from Amorphous Macromolecules, *Macromolecules*, vol. 23, No. 5, 1990, pp. 1256–1264.

Allcock, et al, Effect of Oligo(ethyleneoxy)cyclotriphosphazenes, Tetraglyme, and Other Small Molecules on the Ionic Conductivity of the Poly[bis(methoxyethoxyethoxy) phosphazene]/(MEEP)/Lithium Triflate System, *Macromolecules*, vol. 30, No. 11, 1997, pp. 3184–3190.

Bruce, et al, Polymer Electrolytes, *J. Chem. Soc. Faraday Trans.*, vol. 89, No. 17, 1993, pp. 3187–3203.

Myer, Polymer Electrolytes for Lithium–Ion Batteries, *Adv. Mater.*, vol. 10, No. 6, 1998, pp. 439–448.

Armand, Polymers with Ionic Conducitivity, *Adv. Mater.*, vol. 2, No. 6/7, 1990, pp. 278–286.

Allcock, et al, Hydrophilic Polyphosphazenes ad Hydrogels: Radiaation Cross–linking and Hydrogel Characteristics of Poly[bis(methoxyethoxyethoxy) phosphazene], *Biomaterials*, vol. 9, 1988, pp. 507–511.

* cited by examiner

|  | O(CH₂CH₂O)₂CH₃ | OCH₂CF₃ |
|---|---|---|
| Polymer 3 | 20% | 80% |
| Polymer 4 | 40% | 60% |
| Polymer 5 | 60% | 40% |
| Polymer 6 | 80% | 20% |

Figure 4. VTF Plot of Gels 4e-i

Figure 5. Arrhenius Plot of Gels 5a-d

Figure 6. Ionic Conductivities of Gels with Increasing PC Content at 25°C

Figure 7. Influence of PC Content on Glass Transition Temperature

POLYPHOSPHAZENES AS GEL POLYMER ELECTROLYTES

RELATED APPLICATION

This application is based on Provisional Application Ser. No. 60/214,933, filed Jun. 29, 2000, the disclosure of which is incorporated herein by reference.

BACKGROUND OF THE INVENTION

This invention relates to co-substituted linear polyphosphazene polymers and to their use in gel polymer electrolytes. This invention relates also to the preparation of co-substituted linear polyphosphazene polymers and to the preparation of gel polymer electrolytes in which the linear polyphosphazene polymers of this invention are an essential component.

BACKGROUND OF THE INVENTION

Gel electrolytes are alternatives to both solid polymer electrolytes (hereinafter, SPEs) and liquid electrolytes for battery applications. Gel electrolytes possess some of the advantages and disadvantages of both the solid and liquid systems. In organic, liquid-filled batteries, the liquid electrolytes may escape or present a fire hazard and an inert spacer generally is needed to separate the electrodes. Solid polymer electrolyte systems typically possess the mechanical properties and structural integrity required for battery applications, but have inherently lower conductivities due to the more restricted motion of the polymer molecules. Solid polymer electrolytes are non-volatile, non-corrosive materials, which can readily be processed into virtually any shape or size. In addition, the inherent lightness of weight and flexibility of solid polymer systems enable the production of more robust energy storage devices having high energy densities.

Solid polymeric systems based on poly(ethylene oxide) (hereinafter, PEO) have been investigated thoroughly due to their inherent mechanical advantages over conventional liquid based batteries (see, for example, Armand, M. B., et al, *Second International Conference on Solid Electrolytes*, Armand, M. B., et al Ed., Andrews, Scotland, 1978; Wright, P. U., et al, Polymer, 14, 589 (1973); Gray, F. M., *Solid Polymer Electrolytes: Fundamentals and Technological Applications;* VCH Publishers, Inc., New York (1991); and Vincent, C. A., et al, *Polymer Electrolyte Reviews;* Vincent, C. A., et al Ed., Elsevier Applied Science, New York Vol 1 and 2 (1987). However, despite the benefits afforded by solid polymer electrolytes, the maximum ambient temperature ionic conductivity achieved to date is in the range of $\sim 5 \times 10^{-5}$ S/cm. (Gray, F. M., *Solid Polymer Electrolytes: Fundamentals and Technological Applications;* VCH Publishers, Inc., New York (1991))

Gel polymer electrolyte systems are an attempt to strike a balance between the high conductivity of organic liquid electrolytes and the dimensional stability of solid polymer electrolytes. Gel systems can reach the commercially desired conductivity of $10^{-3}$ S/cm, but typically only when large amounts of an organic liquid are present. Thus, they may suffer from the same problems as liquid electrolytes (see, for example, Sung, H, et al, *Journal of the Electrochemical Society*, 145, 1207 (1998); Croce, F., et al, *Electrochemica Acta*, 39, 2187 (1994); Ballard, G. D. H., et al, *Macromolecules*, 23, 1256 (1990); and Allcock, H. R., et al, *Macromolecules*, 30, 3184 (1997)).

A goal in the synthesis of gel electrolyte systems is to produce a dimensionally stable gel, which can attain high levels of ionic conductivity with minimum amounts of organic additives. The design of such gel systems depends on an understanding of the mechanism of ionic conduction in gels, and on the ability to tune the structure of the polymer component in the gel to optimize the overall physical properties.

In solid poly(ethylene oxide) and related systems that are complexed with a metal salt, such as a lithium salt (i.e., most SPEs), lithium ions coordinate with the oxygen units in the etheric chains, and $Li^+$ ions are passed from one chain segment to another as the polymer undergoes reptation and side chain reorientation (see, Allcock, H. R., et al, *Contemporary Polymer Chemistry*, 2ed., Prentice Hall, Englewood Cliffs, N. J. (1990); Bruce, P. G., et al, *Journal of the Chemical Society: Faraday Transactions*, 89,3187 (1993); and Gray, F. M., *Polymer Electrolytes*, The Royal Society of Chemistry, Cambridge, U.K. (1997)). In order to maximize the transport of ions through the matrix, the polymer must be completely amorphous and have a low glass transition temperature ($T_g$) to facilitate motion of the polymer chains (Meyer, W. H., *Advanced Materials*, 10, 439 (1998)).

In organic liquid electrolytes, the $Li^+$ ions are surrounded by coordinative solvent molecules and migrate through the liquid via diffusion (Armand, M., *Advanced Materials*, 2,278 (1990)). In gel electrolytes, both mechanisms are possible (i.e., diffusion of organic liquids and molecular reorientation by polymer chains and their side groups), although a solvent-assisted mechanism on first consideration appears to be more plausible. However, the extent to which each process affects the ionic conductivity of gel electrolytes is not well understood. One view is that the liquid component plays only a minor role in the movement of the ions, and serves mainly as a plasticizer (Gray, F. M., *Solid Polymer Electrolytes: Fundamentals and Technological Applications;* VCH Publishers, Inc., New York (1991)). In this interpretation the liquid functions mainly to increase the free volume and lower the $T_g$ to allow more facile movement of polymer chains and ions. In this case, the pathway for ionic conduction would mainly involve the polymer and its molecular motion. A second theory suggests that the liquid forms miniature "channels" within the polymer through which solvated ions can move freely via diffusion: In this case, the polymer would serve only as a supportive matrix (Koksbang, R., et al, *Solid State Ionics*, 69, 320 (1994)). The mechanism of conduction may be somewhere between these two extremes and, almost certainly, would depend on the specific system.

Poly(acrylonitrile) and poly(methyl methacrylate) based systems, for example, have been studied as the polymeric component in gel electrolytes. The poly(methyl methacrylate) studies support a mechanism of ionic conductivity controlled primarily by the diffusion of small molecules through the polymer matrix. However, the ionic conductivity of the poly(methyl methacrylate) systems ultimately is supplemented by the faster segmental motion of the polymer backbone due to plasticization (Svanberg, C., et al, *Journal of Chemical Physics*, 111, 1 1216 (1999)). Poly(acrylonitrile) systems, on the other hand, provide clear evidence against the formation of miniature "channels" of liquid since the ionic mobility is impeded more in a gel system than in a liquid system (Stallworth, P. E., et al, *Solid State Ionics*, 73, 119 (1994) and Edmondson, C. A., et al, *Solid State Ionics*, 85, 173 (1996)). Moreover, the measurement of dielectric constants indicates a probable interaction of the metal salt component with the polymer component, which is a further indication of participation by the polymer in the conduction mechanism of the gel electrolytes (Stallworth, P. E., et al, *Solid State Ionics*, 73, 119 (1994)).

Figure 1:
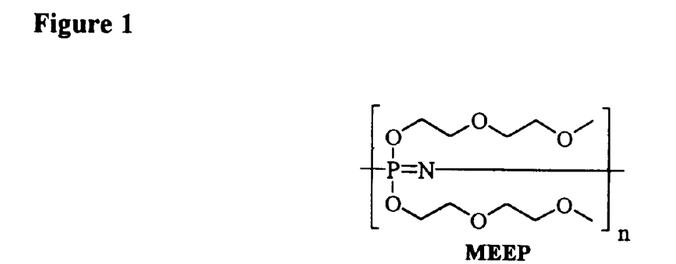
FIG. 1 is a schematic representation of a linear phosphazene polymer, which contains only methoxyethoxyethoxy side chains, and which is know in the art as MEEP.

A system that has been studied extensively for SPE applications is one that is based on poly (organophosphazenes). This class of polymers has yielded excellent candidates for use in SPEs due to the inherent flexibility of the phosphorus-nitrogen backbone and the ease of side group modification via macromolecular substitution-type syntheses. The first poly(organophosphazene) to be used in a phosphazene SPE was poly[bis(2-(2'-methoxyethoxy ethoxy)phosphazene] (hereinafter, MEEP). This polymer was developed in 1983 by Shriver, Allcock and their coworkers (Blonsky, P. M., et al, *Journal of the American Chemical Society,* 106, 6854 (1983)) and is illustrated in FIG. 1. This polymer showed ambient temperature conductivities of $\sim 10^{-5}$ S/cm, which is several orders of magnitude higher than that of solid PEO. Although the development of MEEP was a significant breakthrough in SPE research, its gum-like character requires that it be crosslinked before it can be processed as a free-standing film for energy storage applications.

In addition to MEEP, many other polyphosphazenes have been examined as SPEs, including polymers having longer ethyleneoxy chains, polymers having branched structures, and polymers having crown ether-containing side groups. These polymers were examined, at least in part, in an attempt to improve both the mechanical stability and ionic conductivity of SPEs (see, for example, Allcock, H. R., et al, *Macromolecules,* 30, 3184 (1997); Allcock, H. R., et al, *Macromolecules,* 29, 1951 (1996); Ailcock, H. R., et al, *Macromolecules,* 29, 3384 (1996); Allcock, H. R., et al, *Macromolecules,* 29, 7544 (1996); and Allcock, H. R., et al, *Macromolecules,* 31, 8036 (1998)). These modifications significantly improved the mechanical stability of the polymers, but the maximum conductivity was increased only slightly to $\sim 5 \times 10^{-5}$ S/cm.

Accordingly, there remains a need for developing still further polymers that possess enhanced mechanical stability and an ability, when used in electrolyte systems, to improve the ionic conductivity of the electrolyte systems relative to the ionic conductivity exhibited by SPEs known in the art.

SUMMARY OF THE INVENTION

It is an object of the present invention to provide li near phosphazene polymers that are characterized by mechanical stability and suitability for use in gel polymer electrolytes SPEs.

Another object of the invention is to provide co-substituted linear phosphazene polymers that contain side chains that promote ionic conductivity, as well as side chains that increase mechanical stability.

Still another object is to provide MEEP-type polymers containing methoxyethoxyethoxy side chains to promote ionic conductivity and non-conductive hydrophobic fluorine-containing side chains to increase mechanical stability.

Another object is to provide gel polymer electrolyte systems that comprise (i) co-substituted linear phosphazene polymers that contain side chains that enhance the mechanical stability of the polymer and electrolyte systems, (ii) small organic molecules that promote ionic conductivity of the electrolyte systems, and (iii) a metallic salt that promotes ionic conductivity of the electrolyte systems.

Another object is to provide gel polymer electrolyte which contain co-subsituted phosphazene polymers as the only essential polymer component and which exhibit a conductance at room temperature of at least about $10^{-5}$ S/cm, and preferably, at least about $10^{-4}$ S/cm.

Yet another object is to provide gel polymer electrolyte systems that are based on a MEEP-type linear phosphazene polymer that contains methoxyethoxyethoxy side chains to promote ionic conductivity and non-conductive, hydrophobic fluorinated side chains to increase mechanical stability of the systems.

DETAILED DESCRIPTION OF THE INVENTION

The above and other objects and advantages of the invention are accomplished by incorporating into a linear polyphosphazene polymer chain an amount of first side chain moieties that enhance the ionic conductivity of the starting polymer, and an amount of second side chain moieties that enhance the mechanical stability of the starting polymer. In one embodiment, the starting polymer is a MEEP-type polymer, wherein the first side chain moieties comprise methoxyethoxyethoxy side chains and the second side chain moieties comprise hydrophobic fluorine-containing moieties, such as trifluoroethoxy groups. In another embodiment, the MEEP-type polymer is used to prepare a gel electrolyte system comprising a combination of the MEEP-type polymer with a small organic molecule additive and a metal salt. The salt provides the ions necessary for conduction, while the small organic molecule additive plasticizes the polymer and increases the conductivity of the electrolyte system. In preferred embodiments, the physical and electrical properties of the gel polymer electrolytes are enhanced by taking a two-fold approach; namely, by controlling the identity and ratio of the side chain moieties linked to the phosphazene polymer chain, and by incorporating controlled amounts of a small molecule additive and metal salt into the electrolyte system.

In its broader aspects, the invention contemplates linear phosphazene polymers that may be illustrated by the following formula I:

$$—(NPRR')_q—, \quad \text{I}$$

where R and R', independently, and in any combination, represent side chain groups on a linear polyphosphazene chain and q, which is the number of moles of monomer units in the polymer, is from about 2 to about 20,000, typically from about 500 to about 15,000; with the proviso that at least a portion of the R groups are groups that impart the required ionic conductance to the polymers, and that at least a portion of the R' groups are hydrophobic groups that provide the polymer with the required mechanical stability. Generally, at least about 20 mole % (e.g., from about 20 to about 95 mole %), preferably from about 20 to about 80 mole %, and more preferably from about 60 to about 80 mole %, of the R groups would comprise groups that impart enhanced ion conductance to the polymers. Similarly, the hydrophobic R' groups that impart mechanical stability to the polymers comprise at least about 10 mole % (e.g., from about 10 to about 60 mole %), preferably from about 10 to about 50 mole %, and more preferably from about 10 to about 30 mole %, of the polymers.

The R groups that are contemplated for use in the present invention include, but are not limited to, H, lower alkyl (such as methyl, ethyl, i-propyl, n-pro pyl, n-butyl, s-butyl or t-butyl), $—(CH_2)_zCH_3$, where z is from about 4 to about 100, $—(CH_2)_zCH_3$ (where z is set forth above), $—(OCH_2CH_2)_pOY$ (where p is from 0 to about 1,000 and Y is H or lower alkyl), $—N(H)CH_2CH_2(OCH_2CH_2)_pOY$ (where p and Y are set forth above), $—CH_2CH_2(OCH_2CH_2)_pOY$ (where p and Y are set forth above), $—(SCH_2CH_2)_pSY$ (where p and Y are set forth above), $—N(H)CH_2CH_2(SCH_2CH_2)_pSY$ (where p and Y are set forth above), $—CH_2CH_2(SCH_2CH_2)_pSY$ (where p and Y are set forth above), $—(NHCH_2CH_2)_pNHY$ (where p and Y are set forth above), $—N(H)CH_2CH_2(NHCH_2CH_2)_pNHY$ (where p and Y are set forth above), $—CH_2CH_2(NHCH_2CH_2)_pNHY$ (where p and Y are set forth above), $—Q(CH_2CH_2O)_pY$ (where p and Y are set forth above, and Q is $—(CH_2)_v)—$, where v is from 1 to about 1,0000. Typical R groups that enhance the conductivity of the present polyphosphazenes include, for example, $—(OCH_2CH_2)_v—$, $—(OCH_2)_v—$, $—(CH(CH_2)CH_2O)_v—$, $—(OCH_2CH_2CH_2)_v—$, $—(CH_2)_vC_4H_7O_2$ and $—CH_2C_5H_9O$.

The hydrophobic R' groups that are contemplated for use in the present invention include, but are not limited to, fluoroalkoxy (such as $—OCH_2CF_3$, $—OCH_2CH_2CF_3$, $—OCH_2(CF_2)_vCF_3$ (where v is set forth above), $—OCH_2(CF_2)_pCF_2H$ (where p is set forth above), and $—OCH_2(CF_2)_pCFH_2$ (where p is set forth above)), alkyl groups (such as n-propyl, i-propyl, n-butyl and i-butyl), $—OCH_2Si(CH_3)_2$ and $—(OSi(CH_3)_2)_pOSi(CH_3)_3$ (where p is set forth above).

In a more preferred aspect of the invention, the linear phosphazene polymers may be characterized by the following formula II:

$$—[(NPRR')_r—(NPRR')_s—(NPR'R')_t]_m—.$$

where R and R' are defined above, r is from 0 to about 100,000, s is from 0 to about 100,000, t is from 0 to about 100,000, and m is from 0 to about 100,000; provided that both s and t can not be 0, that R groups which impart ion conductance to the polymer are present in an amount sufficient to impart the required ion conductance to the polymer (i.e., at least about 20 mole %, typically from about 20 to about 95 mole %, and preferably from about 60 to about 80 mole %), and that the R' groups which are hydrophobic and impart mechanical stability to the polymer are present in an amount sufficient to impart the required stability (i.e., at least about 10 mole %, typically from about 10 to about 50 mole %, and preferably from about 20 to about 50 mole %).

In a further preferred aspect, the polyphosphazene polymers of the invention are what may be described as MEEP-type polymers. FIG. 1 illustrates the linear phosphazene polymer poly[bis(2-(2'-methoxyethoxy)ethoxy) phosphazene], also known as MEEP. The preferred MEEP-type polymers are those in which only a portion of the side chain moieties that are linked to the phosphazene polymer chain are methoxyethoxyethoxy groups. The remaining side chain moieties comprise R and R' groups, as identified above, with at least a substantial portion of the remaining groups comprising hydrophobic R' groups that enhance the mechanical stability of the polymers. Preferably, the hydrophobic moieties are fluorine-containing moieties, and more preferably, the fluorine-containing moieties are non-conductive The linear phosphazene polymers of the invention may be prepared by first preparing linear poly (dichlorophosphazene) by the ring-opening polymerization of hexachlorocyclotriphosphazene at about 250° C. This ring-opening polymerization process is well known and is described, for example, in Allcock, H. R., et al, *Macromolecules*, 5,231 (1972), the disclosure of which is incorporated herein by reference. Alternatively, linear poly (dichlorophosphazene) may be prepared by the "living" cationic polymerization of phosphoranimines, as disclosed, for example, in Allcock, H. R., et al, *J. Am. Chem. Soc.*, 117, 7035 (1995), the disclosure of which is incorporated herein by reference. The resulting linear poly (dichlorophosphazene) may then be subjected to side group exchange reactions to replace the chlorine atoms on the polymer chain with appropriate R and R' groups.

Figure 2:
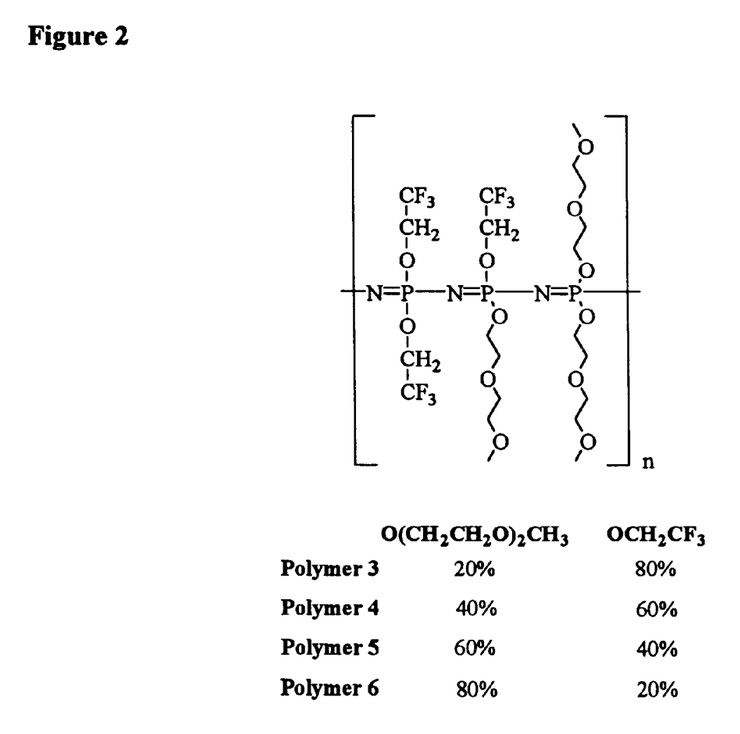
FIG. 2 is a schematic representation of several MEEP-type linear phosphazene polymers (designated as Polymer 3, Polymer 4, Polymer 5 and Polymer 6), wherein the mole % of the side chains on the phosphazene polymer chain that are methoxyethoxyethoxy moieties and the mole % of the side chains that are trifluoroethoxy moieties are shown for each respective polymer.

The overall process for preparing the co-substituted linear phosphazene polymers of the invention will be understood more fully in view of the following examples, particularly when viewed in conjunction with reaction Scheme 1 and FIG. 2, which illustrates four polymers (identified as Polymers 3, 4, 5 and 6) that contain controlled amounts of methoxyethoxyethoxy groups (R groups) and trifluoroethoxy groups (R' groups).

Scheme 1

-continued

In the examples that follow, all materials and reagents were obtained from Aldrich Chemical Company and were used as received unless described otherwise. 2-(2'-methoxyethoxy)ethanol and 2,2,2-trifluoroethanol were distilled prior to use. Tetrahydrofaran (THF) was dried over sodium benzophenone ketyl and distilled prior to use. Sodium hydride was used as received. Reactions involving poly(dichlorophosphazene) were carried out in an atmosphere of dry argon. The water used for dialysis experiments was distilled and deionized. High-field $^1$H (360 MHz), $^{13}$C(90 MHz), and $^{31}$P(146 MHz) NMR spectra were obtained using a Bruker AMX-360 spectrometer. The $^{31}$P and $^{13}$C spectra were proton decoupled unless specified otherwise. $^{31}$P NMR spectra were referenced to external 85% $H_3PO_4$ with positive shifts recorded downfield from the reference. $^1$H and $^{13}$C were referenced to external tetramethylsilane. Elemental microanalyses were obtained by Quantitative Technologies, Inc. in Whitehouse, N.J. Molecular weights were determined with a Hewlett-Packard HP1090 gel permeation chromatograph equipped with a HP-1047A refractive index detector. The samples were eluted with a 0.1% by weight solution of tetra-n-butylammonium nitrate in THF. The GPC column was calibrated with polystyrene standards. Glass transition temperatures were determined by DSC using a Perkin-Elmer-7 thermal analysis system. Gel and polymer samples were heated from –120 to +25° C. under an atmosphere of dry nitrogen. The heating rates used were 10, 20, and 40° C./min. The glass transition temperatures were determined by extrapolating to zero degrees heating rate. Conductivity measurements were made using a Hewlett-Packard 4192A LF impedance analyzer at a potential of 0.1 V with an alternating current frequency range of 5 Hz to 13 MHz. The samples were sandwiched between platinum electrodes separated by a Teflon spacer. The platinum electrode polymer electrolyte cell was compressed between aluminum blocks held in a Teflon fixture. Electrical leads were attached between the impedance analyzer and the aluminumblocks. All conductivity measurements were carried out under an atmosphere of argon at temperatures from 20° C. to 80° C. The temperature was varied by wrapping the entire fixture in heating tape.

EXAMPLE 1

Synthesis of Poly(dichlorophosphazene)

Hexachlorocyclotriphosphazene (Ethyl Corp./Nippon Fine Chemical Co.) was recrystallized from heptane and sublimed at 40° C. (0.05 mm Hg). 200 g of the resulting hexachlorocyclotriphosphazene was subjected to ring-opening polymerization by sealing the hexachlorocyclotriphosphazene in a glass tube at 0.01 mm Hg and heating the tube at 250° C. until the contents thereof became viscous. The material in the tube was then freeze-thawed three times by repeatedly placing the tube into a bath of liquid nitrogen for 20 minutes, followed by warming the tube to room temperature. The tube was then placed in a glove bag and the bag was placed in an argon atmosphere. The tube was cracked with a hammer and the cracked glass was removed from the freeze-thawed poly(dichlorophosphazene) material. The polymer material was comminuted into pea-sized particles, which were sublimed at 40° C. (0.05 mm Hg) to remove unpolymerized hexachlorocyclotriphosphazene.

EXAMPLE 2

Synthesis of $[NP(OCH_2CH_2OCH_2CH_2OCH_3)_{0.41}$ $(OCH_2CF_3)_{1.59}]_n$ (Polymer 3)

2-(2'-methoxyethoxy)ethanol (1.24 g, 0.0103 mol) was added to sodium hydride (0.42 g, 0.0103 mol of a 60% by weight solution in mineral oil) in dry tetrahydrofuran (125 mL) and the mixture was stirred overnight at room temperature to form the corresponding sodium salt. 2,2,2-trifluoroethanol (4.40 g, 0.0440 mol) was added to sodium hydride (1.76 g, 0.0440 mol of a 60% by weight solution in mineral oil) in dry tetrahydrofuran (125 mL) and the mixture was stirred overnight at room temperature to form the corresponding sodium salt. Polydichlorophosphazene (3.0 g, 0.0259 mol, prepared in Example 1) was dissolved in THF (500 mL) and the solution was stirred overnight. The solution of the sodium salt of 2-(2'-methoxyethoxy)ethanol was added dropwise. The resulting solution was stirred warm (50° C.) overnight. The partially substituted polymer solution was allowed to cool to room temperature and the sodium salt of 2,2,2-trifluoroethanol was added dropwise to the polymer solution at room temperature. The resulting solution was stirred warm (50° C.) overnight. The polymer reaction mixture was concentrated by rotary evaporation and precipitated twice into water and twice into hexanes. The final polymer was isolated as a white rubbery solid. The spectra analysis of the final polymer was as follows: $^1$H-NMR, (d$_6$-Acetone) δ (ppm) 4.56, 4.21, 3.70, 3.61, 3.50, 3.29; $^{31}$P-NMR, (d$_6$-Acetone) δ (ppm)-5.5, -6.2; $^{13}$C-NMR, (d$_6$-Acetone) δ (ppm) 128.3, 125.3, 122.2, 119.1, 72.3, 70.7, 70.3, 67.3, 64.5, 64.1, 63.7, 63.3, 58.4. Elemental analysis was as follows: found—C, 25.0; H, 3.1; N, 5.6; F, 36.1; Cl, 0.5; predicted—C, 24.5; H, 3.1; N, 5.8; F, 33.4; Cl,0.0.

EXAMPLE 3

Synthesis of $[NP(OCH_2CH_2OCH_2CH_2OCH_3)_{0.82}$ $(OCH_2CF_3)_{1.18}]_n$, (Polymer 4)

Polymer 4 was prepared in accordance with the procedure set forth in Example 2. The following reagents and quantities were used: poly(dichloropho sphazene) (3.0 g, 0.0259 mol), 2-(2'-methoxyethoxy)ethanol (2.48 , 0.0207 mol), sodium hydride (0.83 g, 0.0207 mol of a 60% by weight solution in mineral oil), trifluoroethanol (3.36 g, 0.0336 mol), and sodium hydride (1.34 g, 0.0336 mol of a 60% by weight solution in mineral oil). The polymer solution was concentrated by rotary evaporation and precipitated twice into water and twice into hexanes. The final polymer was isolated as a white rubbery solid The spectra analysis of the final polymer was as follows: $^1$H-NMR, (CDCl$_3$) δ (ppm) 4.22, 4.00, 3.54, 3.42, 3.25 (m); $^{31}$P-NMR, (CDCl$_3$) δ (ppm) –6.9, –8.0; $^{13}$C-NMR, (CDCl$_3$) δ (ppm) 128.0, 124.9, 121.8, 118.7, 72.1, 70.7, 70.1, 66.8, 64.1, 63.7, 63.3, 63.0, 59.0. Elemental analysis was as follows: found—C, 28.7; H, 4.2; N, 5.5; F, 25.3; Cl, 0.5; predicted—C, 29.9; H, 4.4; N, 5.4; F, 25.9; Cl, 0,0.

EXAMPLE 4

Synthesis of $[NP(OCH_2CH_2OCH_2CH_2OCH_3)_{1.16}(OCH_2CF_3)_{0.84}]_n$, (Polymer 5)

Polymer 5 was prepared in accordance with the procedure set forth in Example 2. The following reagents and quantities were used: poly(dichlorophosphazene) (3 g, 0.0259 mol), 2-(2'-methoxyethoxy)ethanol(3.72 g, 0.0310 mol), sodium hydride (1.23 g, 0.0130 mol of a 60% by weight solution in mineral oil), trifluoroethanol (2.33 g, 0.0233 mol), and sodium hydride (0.93 g, 0.0233 mol of a 60% by weight solution in mineral oil). The polymer was purified by dialysis in water (1 week) and methanol (1 week) followed by precipitation into hexanes. The final polymer was isolated as a white gum. The spectra analysis of the final polymer was as follows: $^1$H-NMR, (CDCl$_3$) δ (ppm) 4.21, 3.95, 3.48, 3.37, 3.21; $^{31}$P-NMR, (CDCl$_3$) δ (ppm) −6.4, −7.8, −8.9; $^{13}$C-NMR, (CDCl$_3$) δ (ppm) 128.3, 125.3, 122.2, 118.7, 72.2, 70.2, 66.4, 65.8, 63.5, 63.1, 62.7, 62.3, 59.1. Elemental analysis was as follows: found—C, 34.7; H, 5.8; N, 5.2; F, 14.1; Cl, 0.1; predicted—C, 33.7; H, 5.5; N, 5.3; Cl, 0.0.

Example 5

Synthesis of $[NP(OCH_2CH_2OCH_2CH_2OCH_3)_{1.58}(OCH_2CF_3)_{0.42}]_n$, (Polymer 6)

Polymer 6 was prepared in accordance with the procedure set forth in Example 2. The following reagents and quantities were used: poly(dichlorophosphazene) (3.0 g, 0.0259 mol), 2-(2'-methoxyethoxy)ethanol (4.97 g, 0.0414 mol), sodiumhydride (1.75 g, 0.0414 mol of a 60% by weight solution in mineral oil), trifluoroethanol (1.29 g, 0.0129 mol), and sodium hy dride (0.52 g, 0.0129 mol of a 60% by weight solution in mineral oil). The polymer was purified by dialysis in water (1 week) and methanol (1 week) followed by precipitation into hexanes. The final polymer was isolated as a soft, highly viscous material. The spectra analysis of the final polymer was as follows: $^1$H-NMR, (CDCl$_3$) δ (ppm) 4.28, 3.98, 3.55, 3.36, 3.28; $^{31}$P-NMR, (CDCl$_3$) δ (ppm) −7.4, −7.7, −8.7; $^{13}$C-NMR, (CDCl$_3$) δ (ppm) 128.1, 125.0, 121.9, 118.8, 71.7, 70.0, 65.5, 65.0, 62.8, 62.5, 62.1, 61.7, 58.6. Elemental analysis was as follows: found—C, 38.8; H, 6.8; N, 5.1; F, 7.1; Cl, 0.1; predicted—C, 38.2; H, 6.7; N, 5.1; F, 8.7; Cl, 0.0.

As can be seen from the above examples, co-substituted linear phosphazene polymers having various ratios of methoxyethoxyethoxy side chains to promote ionic conductivity and non-conductive, hydrophobic trifluoroethoxy groups to increase mechanical stability can be prepared In other polyphosphazenes, the hydrophobic-hydrophobic association between fluorinated side groups provides excellent mechanical stability not found in polymers that contain only oligoethyleneoxy side chains. Thus, the fluoroalkoxy groups could serve as transient physical crosslink sites in a solid or gel electrolyte.

The linear phosphazene polymers of the present invention can be combined with a variety of metal salts and organic small molecule additives for use in preparing gel polymer electrolyte systems. Metal salts for this application include salts of lithium, magnesium, sodium, potassium, rubidium, cesium, beryllium, calcium, magnesium, barium, copper and zinc, with salts of lithium and magnesium being preferred. Salts contemplated for use in this application include, but are not limited to, lithium trifluoromethanesulfonate, lithium perchlorate, lithium(bistrifluoromethylsulfonyl)imide, lithium fluoride, lithium chloride, lithium bromide, lithium iodide, lithium phosphate, lithium sulfate, lithium carbonate, lithium tetrafluoroborate, lithium hexafluoroarsenate(V), lithium hexafluorophosphate, lithium periodate, lithium trifluoroacetate, lithium amide, lithium hexafluoroantimonate, lithium nitrate, lithium oxide, sodium trifluoromethanesulfonate, magnesium trifluoromethanesulfonate, potassium trifluoromethanesulfonate, barium trifluoromethanesulfonate, zinc trifluoromethanesulfonate, calcium trifluoromethanesulfonate, sodium perclhlorate, lithium perclhlorate, magnesium perclhlorate, magnesium perclhlorate, copper perclhlorate, cesium perclhlorate, beryllium perclhlorate, and the like. The amount of salt present in the gel electrolyte may vary over a wide range. Typically, however, the metal salt would be present in the gel systems in an amount of from about 0.1 to about 50 wt %, preferably from about 2.5 to about 15 wt %, and most preferably from about 5.0 to about 10.0 wt %.

Figure 3:
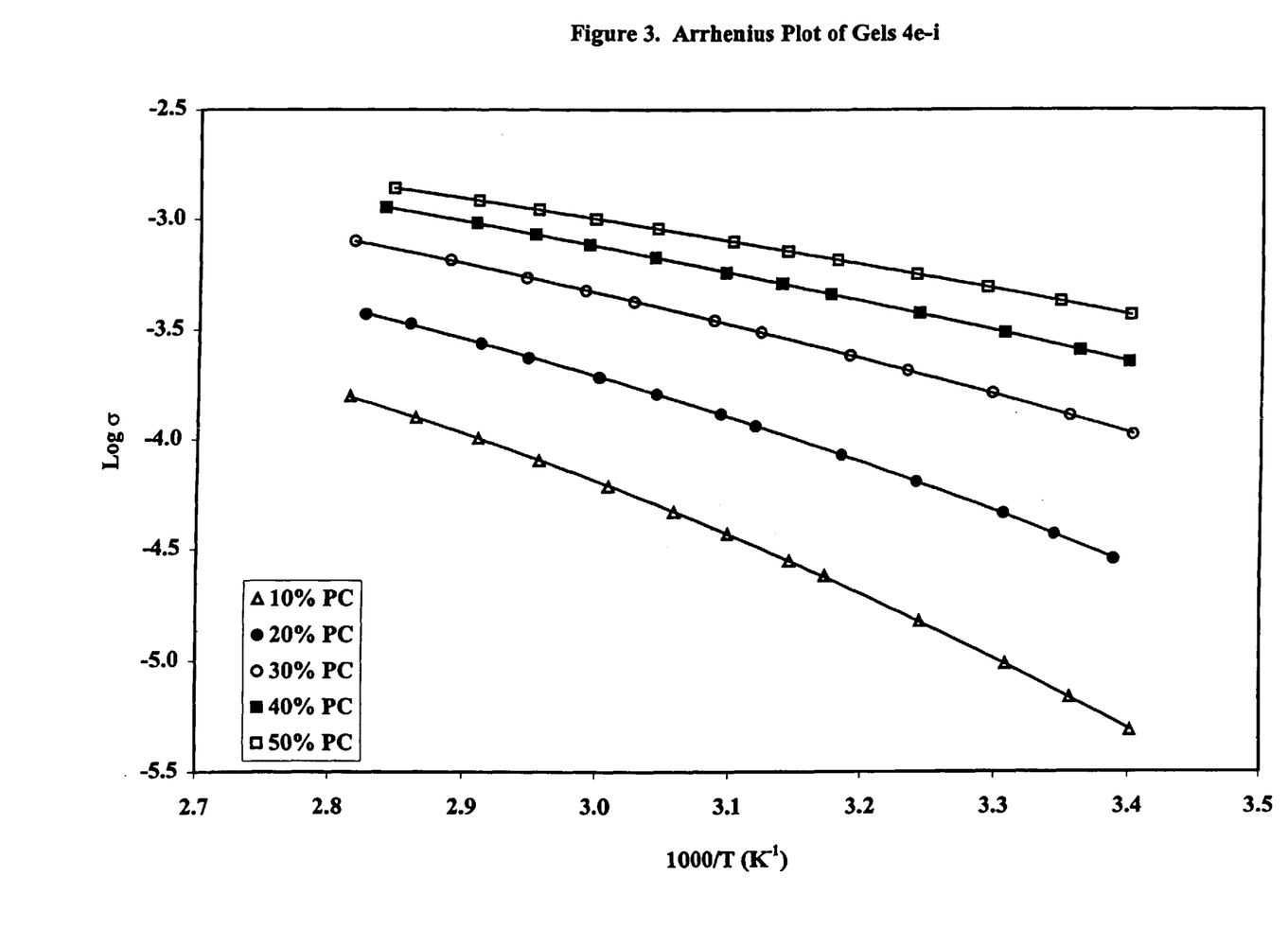
FIG. 3 is an Arrhenius Plot of the five gel electrolyte systems prepared from Polymer 4, propylene carbonate and lithium triflate ($LiSO_3CF_3$) in the relative amounts indicated in Table 1 for Gels e–i, respectively.
Figure 4:
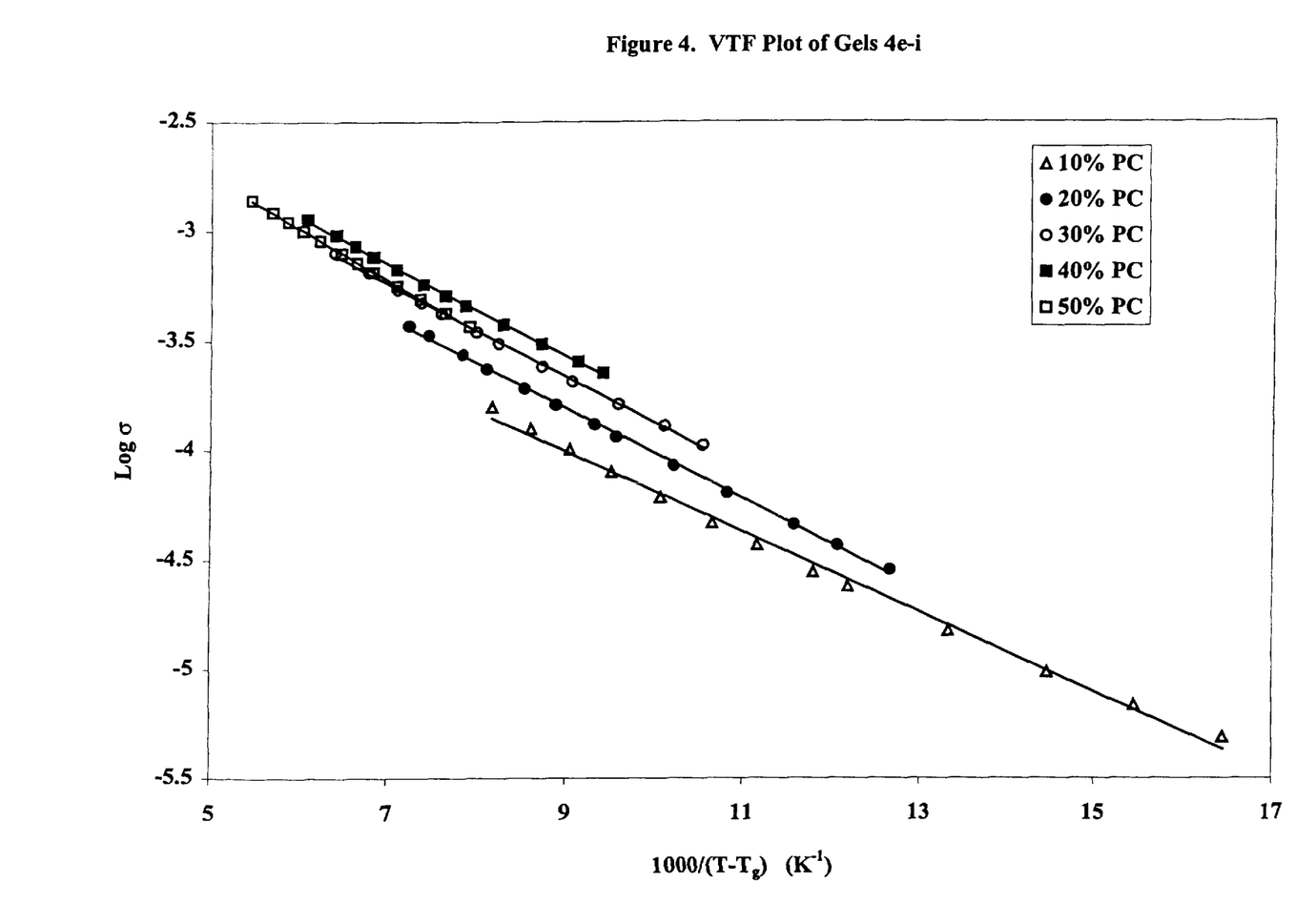
In FIG. 4 is a Vogel-Tamman-Fulcher Plot of the four gel electrolyte systems prepared from Polymer 4, propylene carbonate and lithium triflate in the relative amounts indicated in Table 1 for Gel e–i, respectively.

Small molecule additives that may be added to the gel electrolyte systems include, but are not limited to, alkylene carbonates, such as propylene carbonate (referred to as "PC" in FIGS. 3 and 4), lactones, such as γ-butyrolactone, N-methyl pyrrolidone, tetramethylene sulfone, dioxolane, glymes, such as glyme, diglyme, triglyme, etc., short chain ethylene oxides, short chain ethylene glycols, cyclic phosphazene trimers and tetramers, alkylphosphates, such as triethylphosphate, trimethylphosphate, etc., alkylphosphites, such as trimethylphosphite, triethylphosphite, etc., alkylphosphines, such as trimethylphosphine, triethylphosphine, etc., dibutyl phthalate, dimethylacetamide, dimethylformamide, hexamethyl phosphoramide, substituted pyridines, crown ethers, such as 12-crown-4, 15-crown-5, 18-crown-6, etc., kryptands, such as 1,4,10-trioxa-7,13-diazacyclopentadecane, podands, such as 2,3-dimethoxy propanol, etc., and dioctyl sebacate. The amount of small molecule additive that may be present in the gel electrolyte may vary over a wide range. Typically, the small molecule additive would be present in the gel systems in an amount of from about 5 to about 75 wt %, preferably from about 10 to about 70 wt %, and most preferably from about 10 to about 60 wt %.

Depending on the identity of side chain groups in the poly(phosphazene) polymer, and the identity and amount of the small molecule additive component and of the salt component, the poly(phosphazene) polymer component would comprise at least about 10 wt. %, and preferably, at least 20 wt., of the gel electrolyte system, and amounts of polymer on the order of from about 25 wt. % to about 80 wt. % would be typical. In preferred aspects, the amount of polymer in the contemplated gel electrolyte systems would be on the order of from about 35 to about 75 wt. %.

In the In order to demonstrate the utility of the co-substituted linear phosphazene polymers of the invention in gel electrolyte systems, gel electrolytes were prepared from each of Polymers 3, 4, 5 and 6 by combining the respective polymers with various amounts of propylene carbonate as the small molecule additive and lithium triflate (LiSO$_3$CF$_3$; referred to as "LiOTf" in FIG. 5) as the metal salt. The influence of the polymer structure on the physical properties and ionic conductivity of these gel electrolytes with varying amounts of propylene carbonate and metal salt were determined. Propylene carbonate was used as the small molecule additive because of its widespread use in liquid and gel-type electrolyte systems. In general, in an amorphous solid the larger the number of ion coordination sites, the higher the conductivity. This should remain true in a gel system; and the relative influences of the polymer coordination sites and the propylene carbonate coordination sites on the overall conductivity have been examined.

EXAMPLE 6

Preparation of Gel Electrolytes

Gel electrolytes were prepared from each of Polymers 3, 4, 5 and 6, in nine different compositions (a–i as shown in Table 1). In gels a–d, the polymer/propylene carbonate ratio was held constant while the lithium triflate ($LiSO_3CF_3$) concentration was varied (2.5, 5.0, 7.5, and 10.0% by weight, respectively). In gels e–i, the polymer/$LiSO_3CF_3$ ratio was held constant and the propylene carbonate concentration was varied (10, 20, 30, 40, and 50% by weight). By holding specific ratios constant it was anticipated that the individual contributions of the three gel components (polymer, salt, and additive) to the overall conductivity might become clear. Each gel was prepared by dissolving the polymer and salt in THF followed by removal of the solvent under vacuum for two days at 50° C. Propylene carbonate was then added to the samples and allowed to diffuse into the polymer for at least two weeks before analysis.

Complex impedance analysis was carried out on each of the gels over a temperature range from 20° C. to 80° C. to determine their ionic conductivity. The highest ionic conductivity attained at 25° C. was $7.7 \times 10^{-4}$ S/cm for a Gel 6i having 50% propylene carbonate content (i.e., the gel having the composition "i" in Table 1, using Polymer 6 as the polymer component). The conductivity data at room temperature for the respective gels are summarized in Table 2.

TABLE 1

| Gel | Wt. % Propylene Carbonate | Wt. % Lithium Triflate | Wt. % Polymer |
| --- | --- | --- | --- |
| A | 22.5 | 2.5 | 75.0 |
| B | 21.9 | 5.0 | 73.1 |
| C | 21.3 | 7.5 | 71.2 |
| D | 20.8 | 10.0 | 69.2 |
| E | 10.0 | 22.5 | 67.5 |
| F | 20.0 | 20 | 60.0 |
| G | 30.0 | 17.5 | 52.5 |
| H | 40.0 | 15 | 45.0 |
| I | 50.0 | 12.5 | 37.5 |

TABLE 2

| Sample | $\sigma (10^{-5}$ S/cm) | Sample | $\sigma (10^{-5}$ S/cm) | Sample | $\sigma (10^{-5}$ S/cm) | Sample | $\sigma (10^{-5}$ S/cm) |
| --- | --- | --- | --- | --- | --- | --- | --- |
| 3a | 6.3 | 4a | 6.2 | 5a | 12 | 6a | 8.5 |
| 3b | 5.1 | 4b | 7.6 | 5b | 29 | 6b | 14 |
| 3c | 6.5 | 4c | 5.9 | 5c | 11 | 6c | 9.1 |
| 3d | 2.1 | 4d | 4.6 | 5d | 8.7 | 6d | 12 |
| 3e | 0.1 | 4e | 6.9 | 5e | 1.4 | 6e | 1.5 |
| 3f | 1.2 | 4f | 3.7 | 5f | 6.3 | 6f | 5.9 |
| 3g | 7.1 | 4g | 13 | 5g | 17 | 6g | 21 |
| 3h | — | 4h | 26 | 5h | 31 | 6h | 40 |
| 3i | — | 4i | 43 | 5i | 62 | 6i | 77 |

Figure 5:
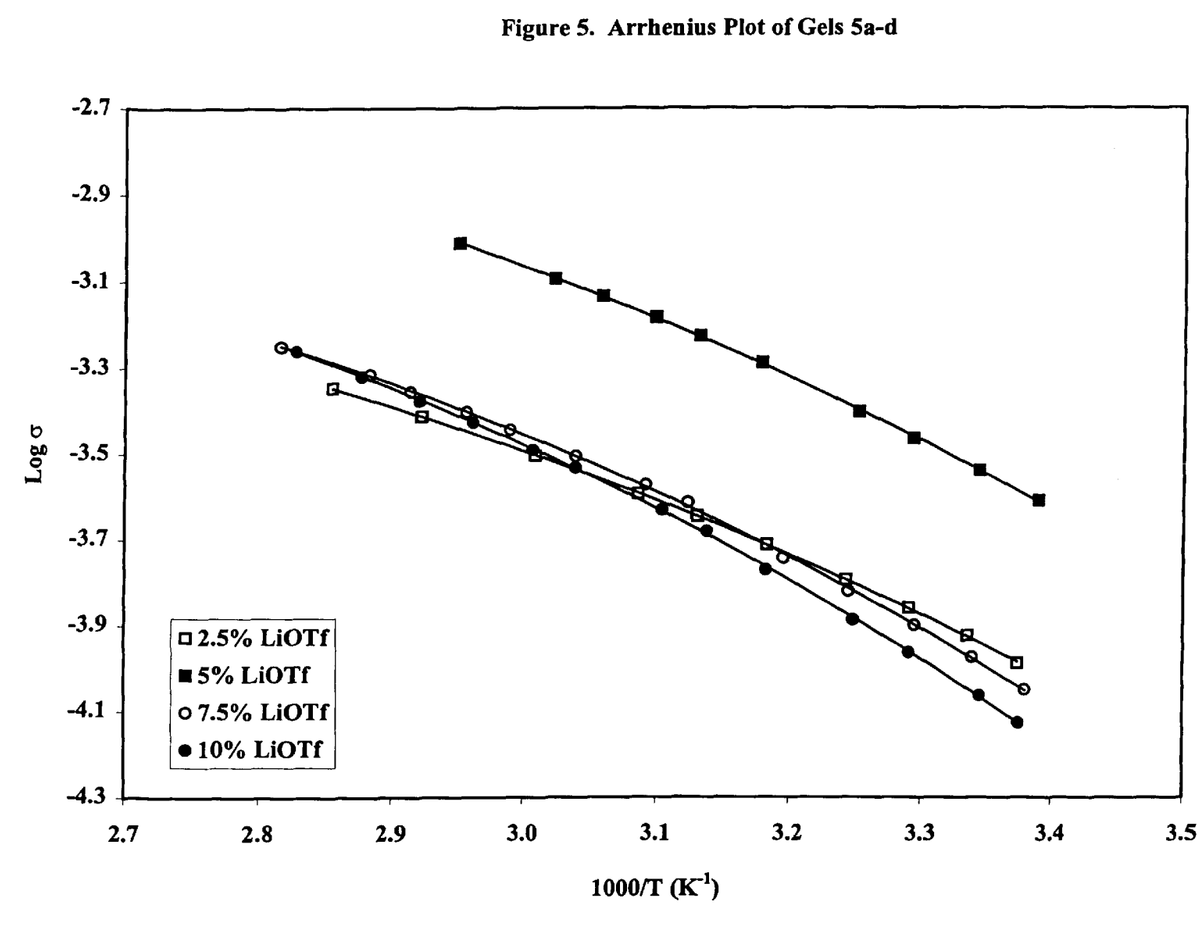
FIG. 5 is an Arrhenius Plot of the four gel electrolyte systems prepared from Polymer 5, propylene carbonate and lithium triflate in the relative amounts indicated in Table 1 for Gels a–d, respectively.
Figure 6:
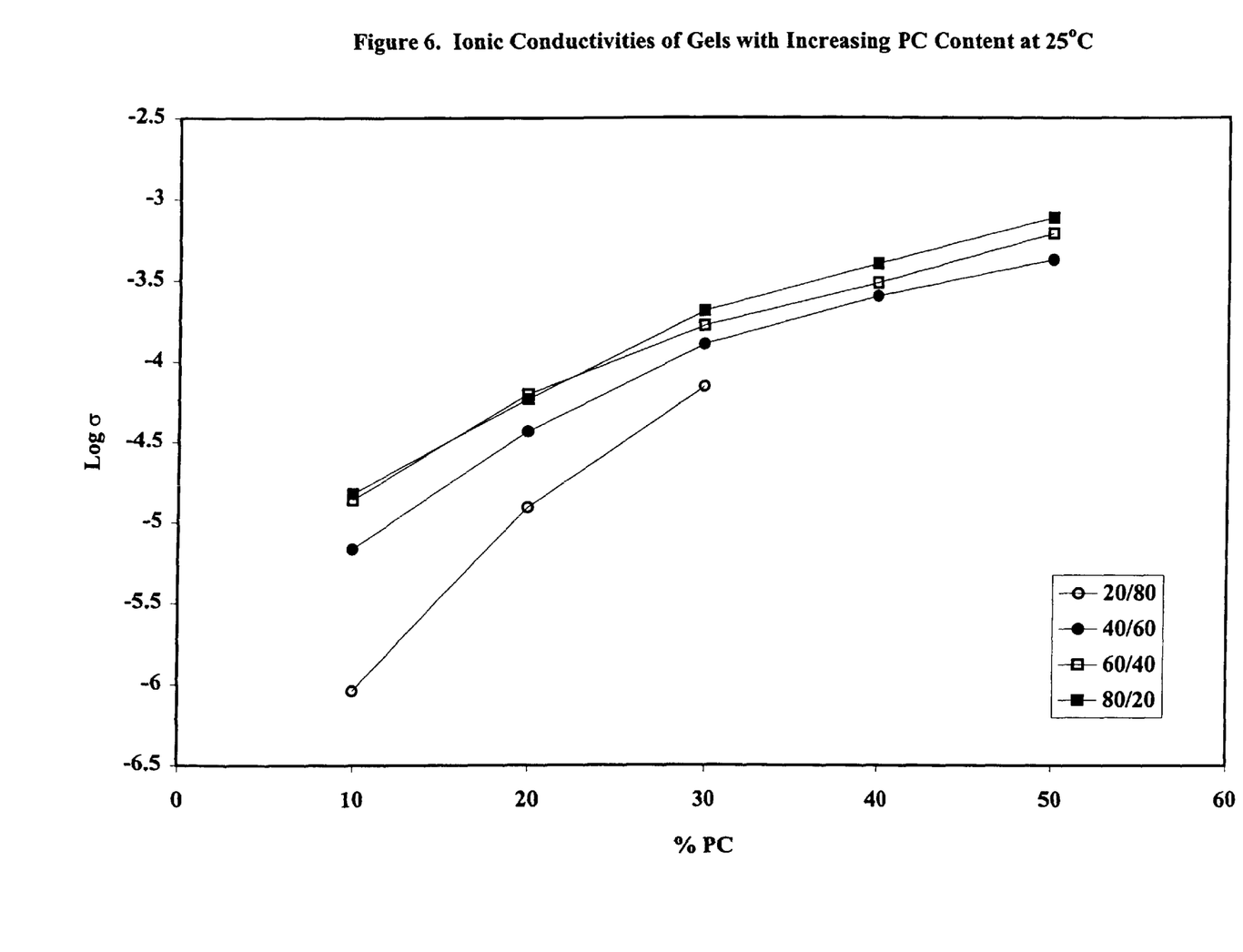
FIG. 6 is a plot of the ionic conductivity of the gel electrolyte systems prepared from Polymers 3, 4, 5 and 6 as a function of the propylene carbonate content in each system.

The ionic conductivity of the gels increased as the propylene carbonate percentage of the gels was increased. This is consistent for all four sets of gels and can be seen in the Arrhenius plot of Gels 4e–i (FIG. 3) where the propylene carbonate content was increased Over the measured temperature range (20° C. to 80° C.) it was also evident that the plots became more linear as more propylene carbonate was added to the system This follows the trend expected for gel electrolytes. As the organic liquid character of the gel is increased, the conductivity data approximate more closely a linear Arrhenius plot (Ratner, M. A., et al, *Chem. Rev.*, 88, 109 (1988). In solvent-free solid polymer electrolytes, coordination sites are linked to the backbone, and only local motion or reptation of the chains can provide a mechanism for the conduction of lithium ions. This behavior is not accurately described by the Arrhenius equation, and it has been determined experimentally that the Vogel-Tamman-Fulcher (VTF) equation closely approximates the behavior of solid polymer electrolytes (see, e. g., Armand, M. B., et al, *Second International Conference on Solid Electrolytes*, Armand, M. B., et al Ed., Andrews, Scotland, 1978; Gray, F. M., *Solid Polymer Electrolytes: Fundamentals and Technological Applications;* VCH Publishers, Inc., New York (1991 ); Gray, F. M., *Polymer Electrolytes,* The Royal Society of Chemistry, Cambridge, U.K. (1997); Ratner, M. A., et al, *Chem. Rev.*, 88,109 (1988); Fulcher, G. S., *J. Am. Ceram. Soc.*, 8, 339 (1929); Tammann, V. G., et al, *Z. Anorg. Allg. Chem.*, 156,245 (1926); and Vogel, H., *Phys. Z.*, 22, 645 (1921)). This relationship includes a temperature correction factor, which generally is assumed to be the glass transition temperature when fitting solid polymer electrolyte data, and which accounts for the restrictions on the movement of polymer chains. When the glass transition temperatures were incorporated into the VTF equation and the data replotted (FIG. 4), linear curves were generated for all the gels tested. This supports a polymer-controlled conductive process in Gels 3e–g. Thus, as a gel contains a larger percentage of propylene carbonate, it tends to behave more as a liquid electrolyte (with its behavior described accurately by the Arrhenius equation) and less as a solid polymer electrolyte. The liquid electrolyte character is also evident in the physical properties of the samples. Once the propylene carbonate level reached 50 percent or more, the mechanical stability of the gel decreased to that of a viscous oil. FIG. 5 shows a similar Arrhenius plot for Gels 5a–d. Here, the gels were compared as the polymeripropylene carbonate ratio was maintained constant (at ~20wt% propylene carbonate), and the amount of salt was varied. The $LiSO_3CF_3$ concentration was varied from 2.5 to 10 wt %. These systems exhibited typical solid polymer electrolyte behavior. The conductivity rises to a maximum for each gel and then decreased with the addition of more salt. The initial increase in conductivity is attributed to a rise in the number of charge carriers. The subsequent decline in conductivity could reflect a number of factors, including the formation of ionic crosslinks between coordination sites on the polymer or a decrease in the number of free coordination sites that can accept a lithium ion. In a gel system that contains ~20 wt % propylene carbonate, it is unlikely that all the coordination sites would be occupied. Therefore, ionic crosslinks are possibly a major reason for the fall-off in conductivity. This is further supported by thermal analysis data, which show an increase in the glass transition temperature as the salt concentration rises. Based on this evidence, it seems unlikely that conduction in these gel systems relies solely on the presence of propylene carbonate. If this were the case, a much higher loading of $LiSO_3CF_3$ should be possible before a plateau or decrease in the conductivity would be expected. Gels comprised of Polymers 5 and 6 contain larger amounts of side chain ethyleneoxy units, and it is not surprising that they reach conductivity maxima at higher salt concentrations. Polymers 5 and 6 have a higher loading of potential coordination sites, and can therefore accommodate more ions before the concentration is high enough to allow significant ionic crosslinking or saturation. This is an example where the polymer plays a significant role in the conductivity of the gel. Thus, from these results it is evident that both the polymer and the propylene carbonate play a role in the overall ionic conduction by the gel. The influence of the polymer side groups is also important. As seen in FIG. 6, all of the polymers show room temperature conductivities of at least about $10^{-5}$ S/cm. Conductivity in the range of $10^{-4}$ S/cm is seen after incorporation of 30% propylene carbonate, and conductivity rises to near $10^{-3}$ S/cm when 50% propylene carbonate is present. The only exception to this is Polymer 3, in which 80% of the side groups are trifluoroethoxy groups. Polymer 3 did not absorb more than 30% by weight of propylene carbonate. This reflects the total insolubility of the single-substituent polymer, poly[bis (trifluoroethoxy)phosphazene], $[NP(OCH_2CF_3)_2]_n$, in propylene carbonate. Polymers 4–6 absorb propylene carbonate readily and Polymers 5 and 6 will dissolve in that solvent when large amounts of that liquid are present. The gels that incorporate Polymers 4–6 (40–80% methoxyethoxyethoxy groups) show similar levels of conductivity at high propylene carbonate loading. This supports the idea that the conductivity of a gel system depends heavily on the polymer at low propylene carbonate concentrations, but relies more on the propylene carbonate at high concentrations.

Thermal analysis of all samples was carried out to compare the glass transition temperatures of the conducting gels. $T_g$ data also demonstrate the presence or absence of coherent single-phase systems. All of the systems were shown to be amorphous over the temperature range examined (–120° C. to –30° C.) No $T_m$ transitions were detected The $T_g$ values for all of the samples are shown in Table 3.

TABLE 3

| Sample | $T_g$ (° C.) | Sample | $T_g$ (° C.) | Sample | $T_g$ (° C.) | Sample | $T_g$ (° C.) |
|---|---|---|---|---|---|---|---|
| 3 | –55 | 4 | –60 | 5 | –66 | 6 | –75 |
| 3a | –75 | 4a | –71 | 5a | –68 | 6a | –78 |
| 3b | –74 | 4b | –75 | 5b | –74 | 6b | –76 |
| 3c | –69 | 4c | –72 | 5c | –72 | 6c | –75 |
| 3d | –65 | 4d | –69 | 5d | –67 | 6d | –70 |
| 3e | –38 | 4e | –40 | 5e | –47 | 6e | –49 |
| 3f | –59 | 4f | –57 | 5f | –64 | 6f | –61 |
| 3g | –75 | 4g | –74 | 5g | –72 | 6g | –71 |
| 3h | — | 4h | –85 | 5h | –88 | 6h | –81 |
| 3i | — | 4i | –105 | 5i | –97 | 6i | –96 |

Figure 7:
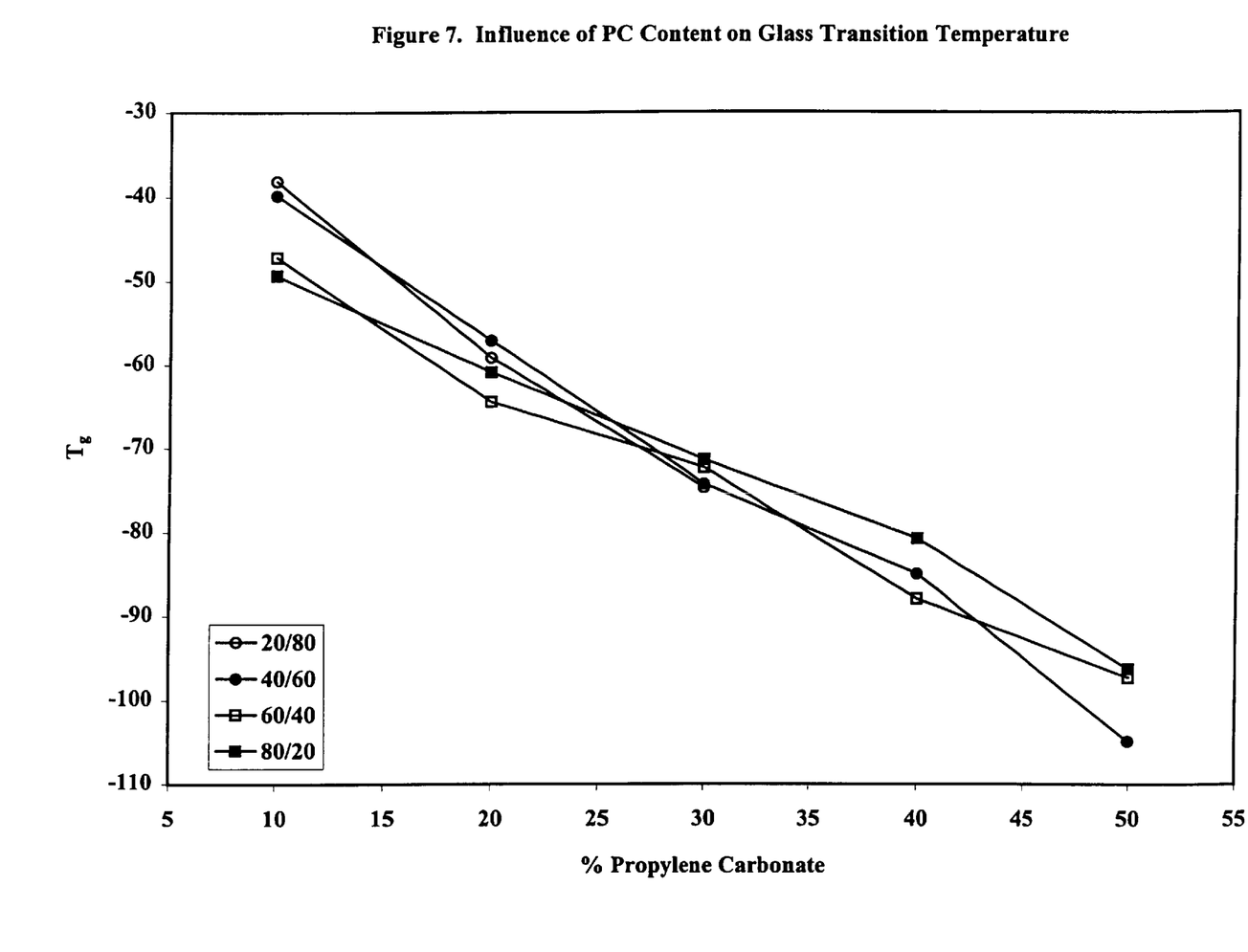
FIG. 7 is a plot of the glass transition temperature ($T_g$) of the gel electrolyte systems prepared from Polymers 3, 4, 5 and 6 as a function of the propylene carbonate content in each system.

The largest influence on the $T_g$ comes from an increased free volume associated with the addition of propylene carbonate. There is a linear decline in $T_g$ as the amount of propylene carbonate is increased. This can be seen in FIG. 7, which shows a plot of glass transition temperature versus propylene carbonate concentration for each of the Polymers 3–6. Because the glass transition temperatures of the parent polymers decrease as the ratio of ethyleneoxy side group is increased, it is not surprising that this trend is followed in the gel systems as well. However, at high propylene carbonate loadings, the trend is reversed, and gels made from polymers with higher ethyleneoxy content have higher $T_g$'s. This cannot be explained in terms of the polymer structure for the reasons just mentioned, and must therefore be a function of the interactions between the polymer, the salt, and the propylene carbonate. Polymer 3 does not form gels when mixed with large amounts of propylene carbonate. A two-phase system is produced which could not be analyzed with the apparatus on hand. This tendency for phase separation may explain the reversal of $T_g$'s. Because the more coherent gels are formed when a higher percentage of ethyleneoxy groups is present, it is submitted that interactions between the polymer and the propylene carbonate underlie the stability of a gel.

With reference to Table 3, it can be seen that the $T_g$ of Polymer 3 is more dramatically affected by the introduction of 20 wt % propylene carbonate (Gel 3a) than the corresponding gels of Polymers 4–6 that contain 20 wt % propylene carbonate (Gels 4a–6a). For example, the difference in $T_g$ between Polymer 3 and Gel 3a is 20° C. whereas the difference in $T_g$ between Polymer 4 and Gel 4a is less than 10° C. This could be due to the differences in free volume of the parent polymers.

MEEP is known to be a highly flexible polymer with a large free volume and low $T_g$. Poly[bis(trifluoroethoxy) phosphazene](hereinafter, TFEP) is known to be a partially crystalline material with less free volume and a higher $T_g$ than the ethyleneoxy derivatives. The greater decline in glass transition temperature may reflect the more pronounced effect of increasing the free volume of TFEP, while the MEEP derivatives already have a high free volume. Another possible factor is ionic crosslinks, which are likely to be less influential in this polymer due to the lower concentration of oligoethyleneoxy units and $Li^+$ ion coordination sites. As the amount of ethyleneoxy functionality is increased, (Polymers 4–6) the potential for ionic crosslinks is also increased. The concentration of coordination sites in the polymer is increased and their closer proximity could allow for more frequent coordination with the same $Li^+$ ions (resulting in ionic crosslinks). These factors could explain the thermal data observed.

Thus, as can be seen from the various tables and figures, it is evident that the co-substituted phosphazene polymers with varying amounts of oligo-ethyleneoxy and trifluoroethoxy side groups have better mechanical stability than MEEP, and provide an excellent starting point for the future development of gel electrolytes. The studies for Polymer 3 were restricted by its inability to absorb more than 20 wt % propylene carbonate. For Polymers 4–6, nine different gels were prepared using various ratios of propylene carbonate and lithium triflate. These gels exhibited good mechanical properties with up to 30 wt % propylene carbonate, and also exhibited a conductance in the range of $10^{-4}$ S/cm.

The mechanism of conduction in the gels is complicated and appears to depend strongly on the specific gel composition. When high levels of propylene carbonate (40–50%) were present in the gels formed from Polymers 4–6, the role of the polymer in the transport of ions appeared to be minimal. When lower concentrations of propylene carbonate (10–20%) were present, the structure of the polymer appeared to have more influence on the conduction. The ionic conductivities of Polymers 5 and 6 were significantly higher than those of Polymers 3 and 4 at low loading of propylene carbonate, probably due to the larger number of available ethyleneoxy coordination sites in Polymers 5 and 6. Also, the presence of more coordination sites allowed a higher optimum concentration of lithium ions before ionic crosslinking became prevalent. However, in order to achieve levels of conductivity suitable for use in energy storage applications with these materials, it is anticipated that a larger amount of propylene carbonate (~50%) would have to be incorporated into the gel. At these solvent levels, covalent crosslinking would be needed in order to improve the mechanical stability of the system and this could be accomplished either by radiation technique (Bennett, J. L., et al, *Chemistry of Materials,* 1, 14 (1989); and Allcock, H. R., et al, *Biomaterials,* 9,507 (1988) or by side group exchange reactions using a fluorinated diol (Ailcock, H. R., et al,

*Macromolecules*, 5,231 (1972). It is also worth noting that many polyphosphazenes are excellent fire retardants and this factor may make it more acceptable to use gels with a relatively high content of the flammable solvent

What is claimed is:

1. A co-substituted linear phosphazene polymer having the formula:

—(NPRR')$_q$— where R and R', independently, and in any combination, represent side chain groups on a linear phosphazene chain and q, which is the number of moles of monomer units in the polymer, is from about 2 to about 20,000; provided, however, (a) that at least a portion of the R groups impart ionic conductance to the polymer, (b) that at least a portion of the R' groups are fluorine-containing or Si-containing non-conductive hydrophobic groups that provide the polymer with mechanical stability, and (c) that the polymer is capable of functioning as the sole polymer component of a gel electrolyte system having a conductance at room temperature of at least about $10^{-5}$ S/cm.

2. A co-substituted linear phosphazene polymer according to claim 1, wherein said polymer is capable of functioning as the sole polymer component of a gel electrolyte system having a conductance at room temperature of at least about $10^{-4}$ S/cm.

3. A co-substituted linear phosphazene polymer according to claim 2, wherein said portion of the R groups that impart ionic conductance to the polymer comprise methoxyethoxyethyoxy groups, and wherein said non-conductive hydrophobic groups that provide the polymer with mechanical stability comprise fluorine-containing moieties.

4. A co-substituted linear phosphazene polymer according to claim 3, wherein said fluorine-containing moieties are selected from the group consisting of —OCH$_2$CF$_3$, —OCH$_2$CH$_2$CF$_3$, —OCH$_2$(CF$_2$)$_v$CF$_3$(where v is from 1 to about 1,000), —OCH$_2$(CF$_2$)$_p$CF$_2$H (where p is from 0 to about 1,000).

5. A co-substituted linear phosphazene polymer according to claim 2, wherein said portion of the R groups that impart ionic conductance to the polymer comprise methoxyethoxyethyoxy groups, and wherein said non-conductive hydrophobic groups that provide the polymer with mechanical stability are selected from the group selected from —OCH$_2$CF$_3$, —OCH$_2$CH$_2$CF$_3$, —OCH$_2$(CF$_2$)$_v$CF$_3$ (where v is from 1 to about 1,000), —OCH$_2$(CF$_2$)$_p$CF$_2$H (where p is from 0 to about 1,000), n-propyl, i-propyl, n-butyl and i-butyl), —OCH$_2$Si(CH$_3$)$_2$ and —(OSi(CH$_3$)$_2$)$_p$OSi(CH$_3$)$_3$ (where p is set forth above).

6. A co-substituted linear phosphazene polymer according to claim 1, wherein said portion of the R groups that impart ionic conductance to the polymer comprise methoxyethoxyethyoxy groups, and wherein said non-conductive hydrophobic groups that provide the polymer with mechanical stability comprise fluorine-containing moieties.

7. A co-substituted linear phosphazene polymer according to claim 6, wherein said fluorine-containing moieties are selected from the group consisting of —OCH$_2$CF$_3$, —OCH$_2$CH$_2$CF$_3$, —OCH$_2$(CF$_2$)$_v$CF$_3$ (where v is from 1 to about 1,000), —OCH$_2$(CF$_2$)$_p$CF$_2$H (where p is from 0 to about 1,000).

8. A co-substituted linear phosphazene polymer having the formula:

—[(NPRR)$_r$—(NPRR')$_s$—(NPR'R')$_t$]$_m$—, where R and R', independently, and in any combination, represent side chain groups on a linear phosphazene polymer chain, r is from 0 to about 100,000, s is from 0 to about 100,000, t is from 0 to about 100,000, and m is from 0 to about 100,000; provided, however, (a) that both s and t can not be 0, (b) that at least a portion of the R groups impart ion conductance to the polymer, (c) that at least a portion oft he R' groups are fluorine-containing or Si-containing hydrophobic groups that impart mechanical stability to the polymer, (d) that the R groups which impart ionic conductance to the polymer comprise at least about 20 mole % of the side chain groups, (e) that the hydrophobic R' groups that impart mechanical stability to the polymer comprise at least about 10 mole % of the side chain groups, and (f) that the polymer is capable of functioning as the sole polymer component of a gel electrolyte system having a conductance at room temperature of at least about $10^{-5}$ S/cm.

9. A co-substituted linear phosphazene polymer according to claim 8, wherein said polymer is capable of functioning as the sole polymer component of a gel electrolyte system having a conductance at room temperature of at least about $10^{-4}$ S/cm.

10. A co-substituted linear phosphazene polymer according to claim 9, wherein said R groups that impart ionic conductance to the polymer comprise methoxyethoxyethyoxy groups, and wherein said non-conductive hydrophobic groups that provide the polymer with mechanical stability comprise fluorine-containing moieties.

11. A co-substituted linear phosphazene polymer according to claim 10, wherein said fluorine-containing moieties are selected from the group consisting of —OCH$_2$CF$_3$, —OCH$_2$CH$_2$CF$_3$, —OCH$_2$(CF$_2$)$_v$CF$_3$ (where v is from 1 to about 1,000) and —OCH$_2$(CF$_2$)$_p$CF$_2$H (where p is from 0 to about 1,000.

12. A co-substituted linear phosphazene polymer according to claim 10, wherein said R groups that impart ionic conductance to the polymer comprise from about 20 to about 80 mole % of the side chain groups, and wherein said hydrophobic R' groups that impart mechanical stability to the polymer comprise from 10 to about 50 mole % of the side chain groups.

13. A co-substituted linear phosphazene polymer according to claim 9, wherein said R groups that impart ionic conductance to the polymer comprise methoxyethoxyethyoxy groups, and wherein said non-conductive hydrophobic groups are selected from the group consisting of —OCH$_2$Si(CH$_3$)$_2$ and —(OSi(CH$_3$)$_2$)$_p$OSi(CH$_3$)$_3$ (where p is set forth above).

14. A co-substituted linear phosphazene polymer according to claim 8, wherein said R groups that impart ionic conductance to the polymer comprise methoxyethoxyethyoxy groups, and wherein said non-conductive hydrophobic groups that provide the polymer with mechanical stability comprise fluorine-containing moieties.

15. A co-substituted linear phosphazene polymer according to claim 14, wherein said fluorine-containing moieties are selected from the group consisting of —OCH$_2$CF$_3$, —OCH$_2$CH$_2$CF$_3$, —OCH$_2$(CF$_2$)$_v$CF$_3$ (where v is from 1 to about 1,000) and —OCH$_2$(CF$_2$)$_p$CF$_2$H (where p is from 0 to about 1,000.

16. A co-substituted linear phosphazene polymer according to claim 8, wherein said R groups that impart ionic conductance to the polymer comprise methoxyethoxyethyoxy groups, and wherein said non-conductive hydrophobic groups are selected from the group consisting of —OCH$_2$Si(CH$_3$)$_2$ and —(OSi(CH$_3$)$_2$)$_p$OSi(CH$_3$)$_3$ (where p is set forth above).

* * * * *